July 13, 1965
S. S. KAHN
3,193,857
METHODS OF PRODUCING STRONG THREADED ANCHORAGES
Filed March 24, 1961
3 Sheets-Sheet 1
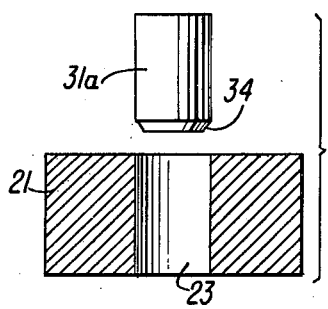
FIG. 1
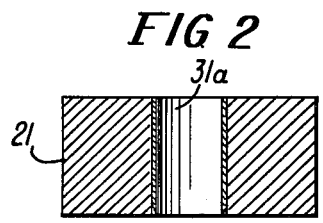
FIG. 2
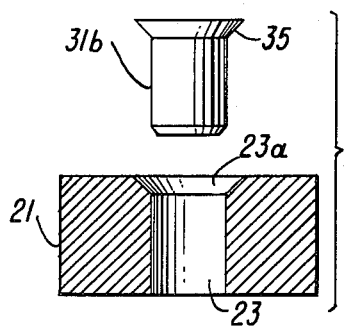
FIG. 3
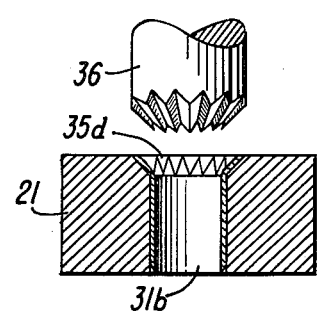
FIG. 4
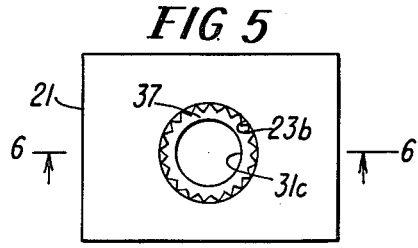
FIG. 5
FIG. 6
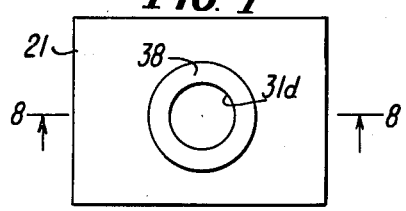
FIG. 7
FIG. 8
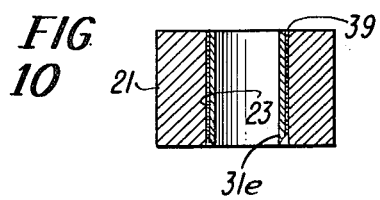
FIG. 10
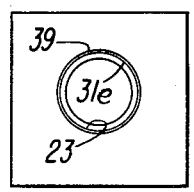
FIG. 9
INVENTOR.
SIMON S. KAHN
BY
Brangley, Baird, Clayton,
Miller & Vogel ATTYS.

July 13, 1965 S. S. KAHN 3,193,857
METHODS OF PRODUCING STRONG THREADED ANCHORAGES
Filed March 24, 1961 3 Sheets-Sheet 2

INVENTOR.
SIMON S. KAHN
BY
Prangley, Baird, Clayton,
Miller & Vogel ATTYS.

July 13, 1965  S. S. KAHN  3,193,857
METHODS OF PRODUCING STRONG THREADED ANCHORAGES
Filed March 24, 1961  3 Sheets-Sheet 3
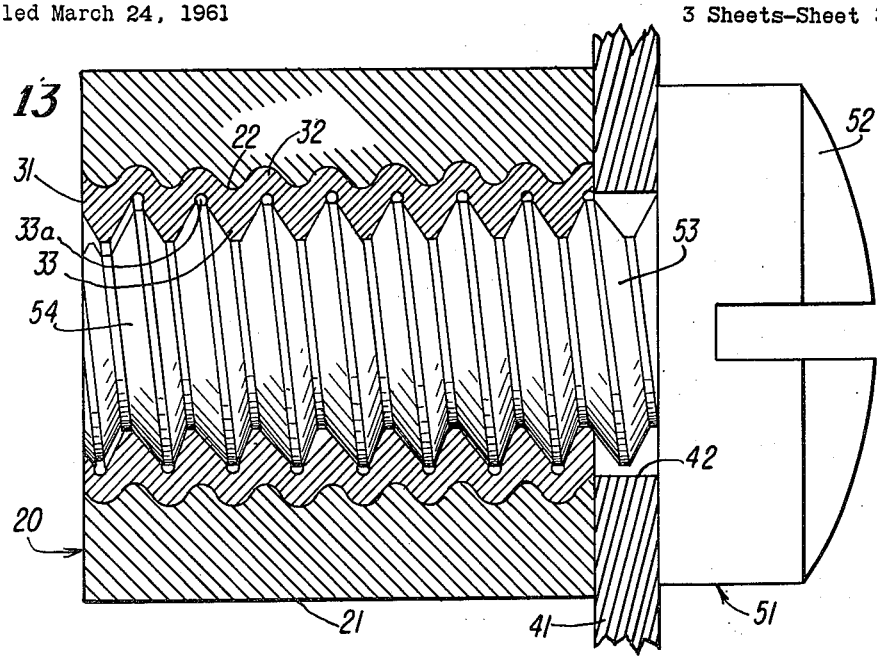
INVENTOR.
SIMON S. KAHN
BY
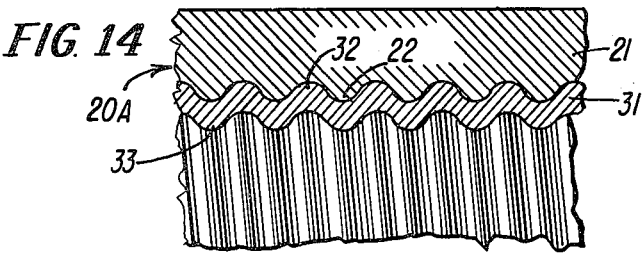
ATTYS.

United States Patent Office 3,193,857
Patented July 13, 1965

3,193,857
METHODS OF PRODUCING STRONG
THREADED ANCHORAGES
Simon S. Kahn, Glen Ridge, N.J., assignor to General
American Transportation Corporation, Chicago, Ill., a
corporation of New York
Filed Mar. 24, 1961, Ser. No. 98,116
6 Claims. (Cl. 10—1)

The present invention relates to methods of producing a strong threaded anchorage in a workpiece formed of relatively soft metal.

It is a general object of the invention to provide an improved and simplified method of producing a strong threaded anchorage in a workpiece of the character noted that involves the incorporation into the workpiece of an insert formed of relatively hard sheet metal and securely anchored in place within a bore provided in the workpiece, the insert being provided with an internal thread that is adapted to receive and to engage a cooperating external thread carried upon the shank of a screw, or the like, so that another part may be readily and securely anchored or fastened to the workpiece.

Another object of the invention is to provide a method of the character noted, wherein a relatively hard sheet metal ferrule is first inserted into a bore provided in the metal workpiece and is then subjected to swaging pressure interiorly thereof with an extremely hard thread-swaging member so as simultaneously to swage an internal thread upon the interior surface of the ferrule and to swage an external thread-like structure upon the exterior surface of the ferrule and to compress an internal thread-like structure upon the workpiece interiorly of the bore, wherein the thread-like structures are complementary and disposed in interlocked frictional engagement with each other so as securely to anchor the ferrule, as an insert, in place in the bore, and wherein the internal thread is adapted to receive and to engage a cooperating external thread carried upon the shank of a screw, or the like, for the fastening purpose.

A further object of the invention is to provide a method of the character described, wherein desired and advantageous relationships are effected between the major and minor diameters of the internal thread and the corresponding major and minor diameters of both the external thread-like structure and the internal thread-like structure.

A still further object of the invention is to provide a method of the character described, wherein the internal thread and the pair of complementary thread-like structures have the same pitch and are disposed in phase with each other.

Further features of the invention pertain to the particular arrangement of the steps of the method, whereby the above-outlined and additional operating features thereof are attained.

The invention, both as to its organization and method of operation, together wih further objects and advantages thereof, will best be understood by reference to the following specification, taken in connection with the accompanying drawings, in which:

FIGURE 1 is an exploded side elevational view, partly in section, of a workpiece and a ferrule that may be employed in the present method in making the anchorage of the present construction;

FIG. 2 is a vertical sectional view of the assembly of the workpiece and the ferrule of FIG. 1;

FIG. 3 is an exploded side elevational view, partly in section, of a modified form of the workpiece and the cooperating ferrule that may be employed in the present method of making the anchorage of the present construction;

FIG. 4 is another side elevational view, partly in section, of the assembly of the workpiece and the ferrule of FIG. 3, and also illustrating a crimping tool that may be employed in producing this assembly;

FIG. 5 is an assembled plan view of another modified form of the workpiece and the ferrule that may be employed in the present method of making the anchorage of the present construction;

FIG. 6 is a vertical sectional view of the assembly of FIG. 5, this view being taken in the direction of the arrows along the line 6—6 in FIG. 5;

FIG. 7 is an assembled plan view of another modified form of the workpiece and the ferrule that may be employed in the present method of making the anchorage of the present construction;

FIG. 8 is a vertical sectional view of the assembly of FIG. 7, this view being taken in the direction of the arrows along the line 8—8 in FIG. 7;

FIG. 9 is an assembled plan view of a further modified form of the workpiece and the ferrule that may be employed in the present method of making the anchorage of the present construction;

FIG. 10 is a vertical sectional view of the assembly of FIG. 9, this view being taken in the direction of the arrows along the line 10—10 in FIG. 9;

Figure 11:
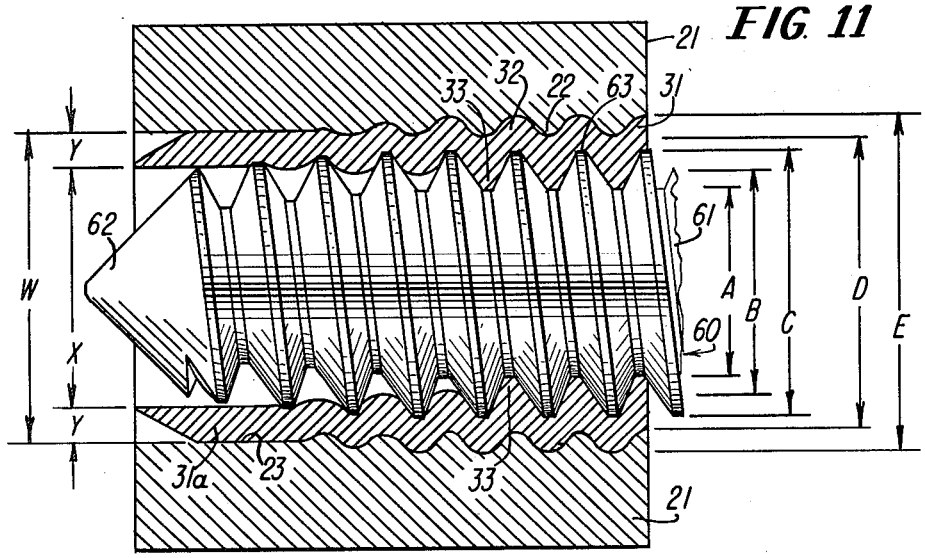
FIG. 11 is a greatly enlarged sectional view of the assembly of FIG. 2 illustrating a subsequent step in the working of the ferrule in accordance with the present method and utilizing a thread-swaging tap.
Figure 12:
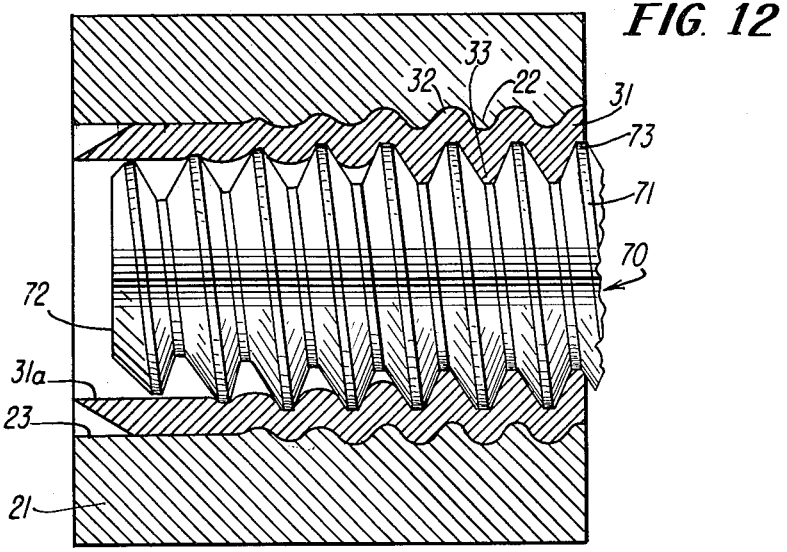
FIG. 12 is another greatly enlarged sectional view of the assembly of FIG. 2, similar to FIG. 11, illustrating an alternative subsequent step in the working of the ferrule in accordance with the present method and utilizing a thread-swaging screw.

FIG. 13 is another greatly enlarged sectional view of the finished article of manufacture, similar to FIGS. 11 and 12, involving a modified thread form and further illustrating the utility of the assembly to secure a plate thereto by a cooperating screw fastener; and FIG. 14 is another greatly enlarged fragmentary sectional view of the finished article of manufacture, similar to FIG. 13, involving a further modified thread form.

Referring now to FIG. 13, the article of manufacture 20 there illustrated may be made in accordance with the method of the present invention; and this article 20 essentially comprises a workpiece 21 formed of relatively soft compressible solid material, and having a hole therein, and a tubular insert 31 formed of relatively hard extrudable material and arranged in the hole mentioned. For example, the workpiece 21 may be formed of a suitable aluminum alloy selected from the series: 2–S, 25–S, 52–S and 61–S; while the insert 31 may be formed of a suitable low carbon steel, such as: SAE 1010. The insert 31 is securely anchored in place in the hole provided in the workpiece 21 by a pair of complementary interlocked and frictionally engaged thread-like structures 22 and 32 respectively swaged in the workpiece 21 and in the insert 31, the thread-like structure 22 comprising an internal thread swaged in the workpiece 21 interiorly of the hole mentioned, and the thread-like structure 32 comprising an external thread swaged upon the exterior surface of the insert 31. Also the insert 31 carries an internal thread 33 swaged in the interior surface thereof.

The article 20 is adapted to be securely fastened to a cooperating part 41 that may be formed of metal by an associated screw 51 that may be formed of hard steel; which screw 51 comprises a slotted head 52 disposed in engagement with the exterior surface of the part 41 and a shank 53 extending through an opening 42 provided in the part 41 and thence into the insert 31. More particularly, the shank 53 of the screw 51 carries an external thread 54 that is received in and engaged by the internal thread 33 carried by the insert 31. As explained more fully hereinafter, the internal thread 33 carried by the insert 31 in cooperating relation with the external thread 54 carried by the shank 53 of the screw 51 is exceedingly strong, and the cooperation between the complementary thread-like structures 22 and 32 provides a secure anchorage between the workpiece 21 and the insert 31; whereby the part 41 may be securely clamped to the workpiece 21 by the screws 51 with a force that is greatly in excess of that otherwise achieved by the utilization of a direct thread arranged internally of the hole provided in the relatively soft workpiece 21.

Turning now to the present inventive method of making the article 20, reference is made to FIGS. 1 and 2, wherein there is shown the workpiece 21 and a ferrule 31a, which ferrule 31a is subsequently worked to produce the insert 31 that is incorporated in the article 20, as described above. Of course, in the present example, the workpiece 21 is formed of the previously mentioned aluminum alloy and the ferrule 31a is formed of the previously mentioned low carbon steel. In the arrangement, a bore 23 is provided in the workpiece 21, and one end of the ferrule 31a is chamfered or beveled, as indicated at 34, so as to accommodate ready insertion thereof into the bore 23. Also, the outside diameter of the ferrule 31a is slightly greater than the internal diameter of the bore 23 so as to insure a tight frictional fit therebetween. The chamfered end of the ferrule 31a is inserted into the adjacent end of the bore 23 and pressure is exerted between the workpiece 21 and the ferrule 31a; whereby the ferrule 31a is pressed into the bore 23 provided in the workpiece 21 so as to produce the assembly, as shown in FIG. 2. Thereafter, the assembly of FIG. 2 is further worked, as explained more fully hereinafter, to produce the finished article 20 of FIG. 13, as previously described.

Referring now to FIGS. 3 and 4, there is shown the workpiece 21 and a slightly modified form of the ferrule 31b. In this arrangement, the bore 23 that is formed in the workpiece 21 is provided with a counter recess 23a, and one end of the ferrule 31b is provided with an outwardly flared or tapered lip or flange 35 that is adapted to be received in the counter recess 23a when the ferrule 31b is pressed into the bore 23. In this arrangement, the simple end of the ferrule 31b is inserted into the end of the bore 23 adjacent to the counter recess 23a and pressed into place, as previously explained and as shown in FIG. 4. Thereafter, the flange 35 is crimped in place in the counter recess 23a, as indicated at 35a in FIG. 4, utilizing a conventional crimping tool, indicated at 36. Thereafter, the assembly of FIG. 4 may be worked, as explained more fully hereinafter, to produce a finished article substantially identical to the article 20, as previously described.

Referring now to FIGS. 5 and 6, there is shown the workpiece 21 and a slightly modified form of the ferrule 31c. In this arrangement, the bore 23 that is formed in the workpiece 21 is provided with a counter bore 23b and one end of the ferrule 31c is provided with an outwardly flared collar 37 that carries exterior serrations or teeth that are adapted to be received in the counter bore 23b when the ferrule 31c is pressed into the bore 23. In this arrangement, the simple end of the ferrule 31c is inserted into the end of the bore 23 adjacent to the counter bore 23b and pressed into place, as previously explained and as shown in FIGS. 5 and 6. When the ferrule 31c is thus pressed into place in the bore 23 provided in the workpiece 21, the teeth carried by the exterior surface of the collar 37 bite into the adjacent wall of the counter bore 23b to increase the frictional fit between the ferrule 31c and the workpiece 21. Thereafter, the assembly of FIGS. 5 and 6 may be worked as explained more fully hereinafter, to produce a finished article substantially identical to the article 20, as previously described.

Referring now to FIGS. 7 and 8, there is shown the workpiece 21 and a slightly modified form of the ferrule 31d. In this arrangement, one end of the ferrule 31d is provided with an outwardly directed flange or lip 38 that is adapted to engage the adjacent outer surface of the workpiece 21 when the ferrule 31d is pressed into the bore 23 provided in the workpiece 21, thereby to increase the frictional contact between the workpiece 21 and the ferrule 31d in the assembly, as shown in FIGS. 7 and 8. Subsequently, the assembly of FIGS. 7 and 8 may be worked, as explained more fully hereinafter, to produce a finished article substantially identical to the article 20, as previously described.

Referring now to FIGS. 9 and 10, there is shown the workpiece 21 and a slightly modified form of the ferrule 31e. In this arrangement, the outside diameter of the ferrule 31e is slightly less than the inside diameter of the bore 23 formed in the workpiece 21; and prior to the insertion of the ferrule 31e into the bore 23, a layer of cement, indicated at 39, is arranged upon the exterior of the ferrule 31e. Thus when the ferrule 31e is placed within the bore 23, it is cemented in place by the layer of cement 39. In this construction, the layer of cement 39 may comprise a suitable epoxy resin. Subsequently, the assembly of FIGS. 9 and 10 may be worked, as explained more fully hereinafter, to produce a finished article substantially identical to the article 20, as previously described.

In view of the foregoing, it will be understood that the ferrule 31a, etc., is securely anchored in place in the bore 23 provided in the workpiece 21; and more particularly, the ferrule 31a is so anchored in place in order that it is not rotated with respect to the workpiece 21 in the bore 23 when the interior of the ferrule 31a is subsequently worked to produce the insert 31 in the finished article 20, as previously explained.

Referring now to FIG. 11, the ferrule 31a, after it has been secured in place in the bore 23 provided in the workpiece 21, may be worked in accordance with the present method utilizing a fluteless thread-swaging tap 60 that may be of the construction and arangement of that disclosed in U.S. Reissue Patent No. 24,572, granted on December 2, 1958 to Donald P. Welles, Jr. The tap 60 is formed of extremely hard material, such as hardened steel, and comprising a shank 61 terminating a point 62 and carrying an external thread 63 upon the exterior surface thereof. As disclosed in the Welles patent mentioned, the external thread 63 is continuous along the exterior surface of the shank 61 and is formed of a series of successively radially relieved sectors circumferentially of the shank 61, the external thread 63 being substantially uniform in cross-section and of substantially equal depth taken in all planes intersecting the axis of the shank 61 longitudinally thereof, wherein the radially relieved sectors of the external thread 63 have gradually increasing outside and pitch and root diameters merging gradually into gradually decreasing outside and pitch and root diameters. More particularly, in this tap 60, three of the radially relieved sectors are provided about the circumference of the shank 61 and disposed in substantially equally angularly spaced-apart relation of approximately 120°.

Continuing with the present method, the tapered end 62 of the tap 60 is inserted into the simple end of the ferrule 31a, whereupon the tap 60 is pressed home and rotated, with the result that the thread 63 carried by the shank 61 subjects the interior surface of the ferrule 31a to swaging pressure so as simultaneously to swage the internal thread 33 upon the interior surface of the ferrule 31a and to swage the external thread-like structure 32 upon the exterior surface of the ferrule 31a and to swage the internal thread-like structure 22 upon the workpiece 21 interiorly of the bore 23. In this action, not only are the internal thread 33 and the complementary thread-like structures 32 and 22 formed simultaneously, but the thread-like structures 32 and 22 are also simultaneously swaged into interlocked frictional engagement with each other so as securely to anchor the insert 31 in place in the bore 23, as the insert 31 is coined in situ from the ferrule 31a. In this coining of the insert 31 from the ferrule 31a, the metal of the ferrule 31a flows radially outwardly from the interior surface of the ferrule 31a to produce the roots of the internal thread 33 and flows radially inwardly from the interior surface of the ferrule 31a to produce the crests of the internal thread 33, by virtue of the plastic flow of the metal in contact with the extremely hard thread 63 carried upon the exterior surface of the shank 61 of the thread-swaging tap 60. Also, in this coining of the insert 31 from the ferrule 31a, the metal of the ferrule 31a flows radially outwardly from the exterior surface of the ferrule 31a to produce the crests of the external thread-like structure 32, thereby causing the metal of the workpiece 21 to flow radially outwardly from the interior surface of the bore 23 to produce the roots of the internal thread-like structure 22; and likewise, the metal of the workpiece 21 flows radially inwardly from the interior of the bore 23 to produce the crests of the internal thread-like structure 22, thereby causing the metal of the ferrule 31a to flow radially inwardly of the exterior surface thereof to produce the roots of the external thread-like structure 32.

These relationships may be readily understood from the nomenclature applied to FIG. 11, wherein it will be observed that the initial external diameter of the ferrule 31a is represented as "W," the initial internal diameter of the opening provided in the ferrule 31a is indicated as "X," and the initial wall thickness of the ferrule 31a is indicated as "Y". The thread 63 carried by the shank 61 of the thread-swaging tap 60 has a minor diameter indicated as "A," a pitch diameter indicated as "B" and a major diameter indicated as "C," whereby the internal thread 33 has a minor diameter "A," a pitch diameter "B" and a major diameter "C". The external thread-like structure 32 has a minor diameter indicated as "D," and a major diameter indicated as "E"; and likewise, the internal thread-like structure 22 has a minor diameter "D" and a major diameter "E". In these relationships, it will be further observed that the minor diameter "A" of the internal thread 33 is substantially less than the initial internal diameter "X" of the opening in the ferrule 31a; the pitch diameter "B" of the internal thread 33 is only somewhat less than the initial internal diameter "X" of the opening in the ferrule 31a; while the major diameter "C" of the internal thread 33 is substantially greater than the initial internal diameter "X" of the opening in the ferrule 31a. Similarly, the minor diameter "D" of the external thread-like structure 32 and the corresponding minor diameter "D" of the internal thread-like structure 22 are somewhat less than the initial internal diameter "W" of the bore 23; while the major diameter "E" of the external thread-like structure 32 and the corresponding major diameter "E" of the internal thread-like structure 22 are somewhat greater than the initial internal diameter "W" of the bore 23.

In the production of the insert 31 from the ferrule 31a, it is preferable that the ferrule 31a has an initial length so that the resulting internal thread 33 in the insert 31 has a length that is somewhat greater than the major diameter "C" of the internal thread 33, so as to improve the holding effect of the cooperating screw that is ultimately employed in engagement with the internal thread 33; and normally a minimum figure of 1½:1 is recommended as a ratio between the overall length of the internal thread 33 and the major diameter "C" thereof.

Of course, it will be understood that the particular form of the internal thread 33 that is produced on the interior surface of the insert 31 is dependent upon the form of the thread 63 carried upon the shank 61 of the thread-swaging tap 60; and various thread forms may be readily obtained by the utilization of different ones of the thread-swaging taps 60 that are manufactured and sold commercially by the Besly-Welles Corporation. While the particular form of the internal thread 33 is determined by the particular form of the thread 63 provided on the shank 61 of the thread-swaging tap 60, as noted above, each of the thread-like structures 32 and 22 has a substantially sinuous configuration more or less independent of the particular form of the thread 63, since the thread-like structures 32 and 22 are produced by plastic flow of the metal of the ferrule 31a and of the metal of the workpiece 21, as previously explained. Also, another peculiarity exists in that the internal thread 33 and the two complementary thread-like structures 32 and 22 are of the same pitch and in phase with each other, regardless of the particular form of the thread 63 carried by the shank 61 of the thread-swaging tap 60. This relationship necessarily exists by virtue of the fact that it is the crest of the thread 63, regardless of the form thereof, that produces the fundamental swaging pressure and the consequent plastic flow of the metal of the ferrule 31a and of the metal of the workpiece 21. This circumstance that the internal thread 33 is in phase with the two thread-like structures 32 and 22 is very advantageous, since it is directly useful in increasing the anchorage of the insert 31 in the workpiece 21 in the ultimate utilization of the composite article 20 in its cooperation with the associated screw 51, as previously explained.

Referring now to FIG. 12, the ferrule 31a, after it has been secured in place in the bore 23 provided in the workpiece 21 may be worked in accordance with the present method utilizing a fluteless thread-swaging screw 70 that may be of the construction and arrangement of that disclosed in U.S. Patent No. 2,352,982, granted on July 4, 1944 to Joseph J. Tomalis. The screw 70 is formed of extremely hard material, such as hardened steel, and comprising a shank 71 terminating in a restricted end 72 and carrying an external thread 73 upon the exterior surface thereof. As disclosed in the Tomalis patent mentioned, the external thread 73 is continuous along the exterior surface of the shank 71 and is of substantially uniform polygonal cross-section with rounded corners throughout the major portion of its length, the thread 73 being of substantially uniform depth. More particularly, in this screw 70, four of the rounded corners are provided about the circumference of the shank 71 and disposed in substantially equally angularly spaced-apart relation of approximately 90°.

Continuing with the present method, the restricted end 72 of the screw 70 is inserted into the simple end of the ferrule 31a, whereupon the screw 70 is pressed home and rotated with the result that the thread 73 carried by the shank 71 subjects the interior surface of the ferrule 31a to swaging pressure so as simultaneously to swage the internal thread 33 upon the interior surface of the ferrule 31a and to swage the external thread-like structure 32 upon the exterior surface of the ferrule 31a and to swage the internal thread-like structure 22 upon the workpiece 21 interiorly of the bore 23. In this action, the ferrule 31a is coined into the insert 31 by the thread 73 carried by the shank 71 of the swaging screw 70, in a manner substantially identical to that of the action of the thread-swaging tap 60, as previously described. In fact, the forms of the internal thread 33 and the external thread-like structure 32 and the internal thread-like structure 22 that are produced by the thread-swaging screw 70 may be identical to the forms previously described in conjunction with FIG. 11 that are produced by the thread-swaging tap 60, assuming that the form of the thread 73 carried by the shank 71 of the screw 70 corresponds to that of the thread 63 carried by the shank 61 of the thread-swaging tap 60. Accordingly, the detailed description of the coining action of the thread-swaging screw 70 upon the ferrule 31a to produce the insert 31 is not repeated in the interest of brevity. Moreover, it will be understood that the form of the internal thread 33 that is produced by the thread-swaging screw 70 is dependent upon the form of the external thread 73 carried by the shank 71 of the thread-swaging screw 70, as previously explained.

Again referring to FIG. 13, it is pointed out that the form of the internal thread 33 carried by the insert 31 is slightly different from the forms of the internal thread 33 carried by the inserts 31, as respectively shown in FIGS. 11 and 12; and more particularly, the internal thread 33 carried by the insert 31, as shown in FIG. 13, comprises a root 33a that is peculiarly truncated in the general form of a semi-circle in cross-section. Of course, this particular form of the internal thread 33, as shown in FIG. 13, resulted from the utilization of a thread-swaging tap or thread-swaging screw that was somewhat different from the tap 60 and the screw 70, as previously explained.

Referring now to FIG. 14, a modified form of the article of manufacture 20A is there illustrated that essentially comprises the workpiece 21 and the insert 31; wherein the internal thread 33 provided in the workpiece 31 has still a different form with respect to the internal threads 33 provided in the inserts 31, as respectively shown in FIGS. 11, 12 and 13. More particularly, in this construction of the article 20A, the internal thread 33 is of substantially sinuous form; and of course, the external thread-like structure 32, as well as the internal thread-like structure 22, each has a substantially sinuous form. Again, it is noted in the article 20A of FIG. 14, the internal thread 33 and the two thread-like structures 32 and 22 have the same pitch and are in phase with each other for the reasons previously explained. Of course, it will be appreciated that the internal thread 33 of the article 20A was produced by a thread-swaging tap or by a thread-swaging screw that was somewhat different from the tap 60 and the screw 70 with respect to the form of the screw carried by the shank thereof. Specifically, the tap or the screw that was employed in the production of the internal thread 33 in the article 20A necessarily had a generally sinuous form.

In view of the foregoing, it will be understood that in the present method of making the articles 20 and 20A, the material of the workpiece 21 is substantially reinforced by the material of the insert 31. Thus, by definition, the material of the workpiece 21 must be formed of a relatively soft compressible solid material and the material of the insert 31 must be formed of relatively hard material characterized by plastic flow under swaging pressure. Accordingly, the material of the workpiece 21 is normally selected from the class consisting of soft metals and organic resinous compositions, wherein the class of soft metals consists of aluminum, magnesium, titanium, zinc, copper, brass, bronze and malleable iron, while the class of organic resinous compositions includes phenol-formaldehyde resin, methylmethacrylate resin, etc. The material of the ferrule 31a, from which the insert 31 is formed, is normally selected from the class consisting of steel and copper base alloys (brass and bronze); and within this class low carbon steels and stainless steels are ordinarily preferred. Stainless steel normally comprises those steels containing sufficient chromium to render the same corrosive-resistant, these steels normally containing at least about 10% chromium by weight. For example, the stainless steels employed may be selected from the series including Types 309, 414, 440 and 446.

Moreover, the hardness characteristic of the material of the ferrule 31a is selected in view of the hardness characteristic of the material of the workpiece 21; whereby a wide range of relatively soft materials employed in the workpiece 21 may be satisfactorily reinforced by a wide range of relatively hard materials employed in the ferrule 31a.

Furthermore, the wall thickness of the insert 31 must be correlated with reference to the size of the screw that is to be employed in the anchorage in the workpiece 21; and in this connection, it is pointed out that the present method and resulting article of manufacture are very advantageous in the production of a strong threaded anchorage of the character described, utilizing relatively small screw sizes, particularly the small screw sizes of the Unified National Coarse (UNC) thread series, as follows: #4–40; #5–41; #6–32; #8–32; #10–24; #12–24; ¼–20; ⁵⁄₁₆–18; etc.

In producing the anchorage in accordance with the method of the present invention in the workpiece 21 involving the range of screw sizes noted above, it has been determined that the optimum wall thickness of the insert 31 may be readily established by appropriately selecting the initial wall thickness of the ferrule 31a from which the insert 31 is coined in the present method, as previously described. For example, in a series of tests involving the workpiece 21 formed of an aluminum alloy and the ferrule 31a formed of a low carbon steel (SAE 1010) and having an initial length of about 1½ times the major diameter of the thread 54 provided on the shank 53 of the screw 51 of size ¼–20, as described in conjunction with FIG. 13, it was determined that the initial wall thickness "Y" of the ferrule 31a should fall in the general range 0.012″ to 0.022″.

In conjunction with these tests noted above, it was established that the outside diameter of the ferrule 31a should be equal to the maximum thread diameter of the screw plus about 0.002″, and that the wall thickness of the ferrule 31a should be in the general range 49% to 54% of the thread depth of the screw, with an average value of about 53% of the thread depth of the screw. Thus, in this example for the screw 51 of size ¼–20, it follows that the outside diameter of the ferrule should be equal to 0.250″+0.002″ or 0.252″, and the wall thickness of the ferrule 31a should be equal to 0.032″×53% or 0.017″. It follows that the inside diameter of the opening in the ferrule 31a should be equal to 0.252″−2(0.017″) or 0.218″. Accordingly, in the example of FIG. 11, the outside diameter "W" of the ferrule 31a should be equal to 0.252″, the inside diameter "X" of the opening in the ferrule 31a should be 0.218″, and the wall thickness "Y" of the ferrule 31a should be 0.017″. With this arrangement, when the insert 31 is ultimately formed from the ferrule 31a, the internal thread 33 provided in the insert 31 produces a 75% thread engagement with the external thread 54 carried by the shank 53 of the screw 51, as shown in FIG. 13.

In connection with these considerations involving the hardness characteristics of the workpiece 21 and of the ferrule 31a, as well as the initial wall thickness "Y" of the ferrule 31a, the following general considerations are noted:

(1) If the material of the ferrule 31a is not substantially harder than the material of the workpiece 21, the resulting anchorage in the workpiece 21 will not be adequately reinforced.

(2) If the material of the ferrule 31a has a hardness characteristic that greatly exceeds the hardness characteristic of the workpiece 21, the ferrule 31a cannot be properly coined to produce the insert 31, as previously described.

(3) If the initial wall thickness "Y" of the ferrule 31a is "too thin" there is not adequate body or wall thickness in the resulting insert 31 to produce the desired reinforcement of the anchorage to the workpiece 21, since the internal thread 33 substantially cuts-through the wall of the resulting insert 31.

(4) If the initial wall thickness "Y" of the ferrule 31a is "too thick," there is not adequate depth of thread in the complementary thread-like structures 32 and 22 to provide a secure anchorage of the insert 31 into the bore 23 provided in the workpiece 21.

In view of the above description, it will be appreciated that while the optimum hardness of the ferrule 31a with respect to the known hardness of the workpiece 21, as well as the optimum initial wall thickness "Y" of the ferrule 31a, must be established empirically, these factors may be thus relatively established in a simple manner so as to provide the previously described reinforced anchorage in the workpiece 21.

The combination of the workpiece formed of relatively soft metal and the tubular insert, together with the particular thread arrangements, as an article of manufacture, is disclosed and claimed in the copending application of Simon S. Kahn, Serial No. 424,466, filed December 10, 1964.

In view of the foregoing, it is apparent that there has been provided an improved method of producing a strong threaded anchorage in a workpiece formed of relatively soft compressible metal.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The method of producing a strong threaded anchorage in a workpiece formed of relatively soft metal, comprising providing a substantially cylindrical bore in said workpiece, providing a ferrule formed of relatively hard sheet metal characterized by plastic flow under swaging pressure and having a substantially cylindrical opening therein, securing said ferrule in place in said bore with the exterior surface of said ferrule in frictional engagement with the adjacent surface of said workpiece interiorly of said bore and subjecting the interior surface of said ferrule to swaging pressure with an extremely hard thread-swaging member so as simultaneously to swage an internal thread upon the interior surface of said ferrule and to swage an external thread-like structure upon the exterior surface of said ferrule and to compress an internal thread-like structure upon said workpiece interiorly of said bore, wherein said thread-like structures are complementary and said external thread-like structure is swaged into interlocked frictional engagement with said internal thread-like structure so as securely to anchor said ferrule in place in said bore, said internal thread having a major diameter that is greater than the initial diameter of said opening and a minor diameter that is less than the initial diameter of said opening, said internal thread being adapted to receive and to engage a cooperating external thread carried upon the shank of a screw, or the like.

2. The method set forth in claim 1, wherein said internal thread has a pitch diameter that is also somewhat less than the initial diameter of said opening.

3. The method set forth in claim 1, wherein each of said thread-like structures has a major diameter that is greater than the initial diameter of said bore and a minor diameter that is less than the initial diameter of said bore.

4. The method set forth in claim 1, wherein said ferrule has an initial wall thickness that is substantially less than the thread depth of said internal thread.

5. The method set forth in claim 1, wherein said ferrule has an initial wall thickness that is in the general range 49% to 54% of the thread depth of said internal thread.

6. The method of producing a strong threaded anchorage in a workpiece formed relatively soft metal and provided with a bore therein, comprising providing a ferrule formed of relatively hard sheet metal characterized by plastic flow under swaging pressure and including an elongated tubular body terminating at the outer end thereof in an enlarged head and having an opening extending from the exterior axially through said head and into said body, inserting said body into said bore and with the exterior surface of said body in frictional engagement with the adjacent surface of said workpiece interiorly of said bore and with said head in frictional engagement with the adjacent surface of said workpiece exteriorly of said bore, inserting an elongated thread-swaging member from the exterior into the outer end of said opening, and operating said thread-swaging member from the exterior to subject the interior surface of said body to swaging pressure so as to swage an internal thread thereupon, said subjecting of the internal surface of said body to swaging pressure also simultaneously swaging an external thread-like structure upon the exterior surface of said body and compressing an internal thread-like structure upon said workpiece interiorly of said bore, wherein said thread-like structures are complementary and said external thread-like structure is swaged into interlocked frictional engagement with said internal thread-like structure so as securely to anchor said body in place in said bore, said internal thread having a major diameter that is greater than the initial diameter of said opening and a minor diameter that is less than the initial diameter of said opening, said internal thread being adapted to receive and to engage a cooperating external thread carried upon the shank of a screw, or the like.

References Cited by the Examiner

UNITED STATES PATENTS

| | | |
|---|---|---|
| 843,650 | 2/07 | Wilkinson. |
| 1,570,234 | 1/26 | Feldmar. |
| 2,062,640 | 12/36 | Clouse _____ 10—86 |
| 2,765,697 | 10/56 | Brush _____ 151—41.73 |
| 2,791,787 | 5/57 | Neuschotz _____ 10—86 |
| 2,807,813 | 10/57 | Welles _____ 10—152 |
| 2,936,014 | 5/60 | Kraus et al. _____ 151—41.74 |

WHITMORE A. WILTZ, *Primary Examiner.*

CARL W. TOMLIN, *Examiner.*